Dec. 24, 1940.  E. P. DAVEY  2,226,158

PHOTOGRAPHIC EMULSION

Filed May 9, 1939

FIG. 1

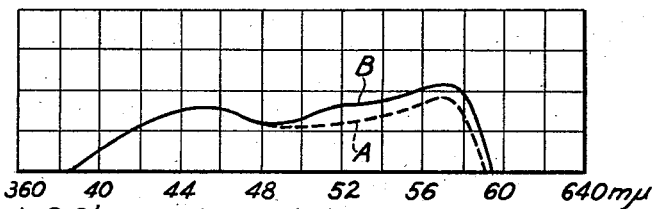

A = 1,1'-diethyl-2,2'-cyanine iodide.
B = 1,1'-diethyl-2,2'-cyanine iodide with 1-methyl-2-acetylmethylene-β-naphthothiazoline.

FIG. 2

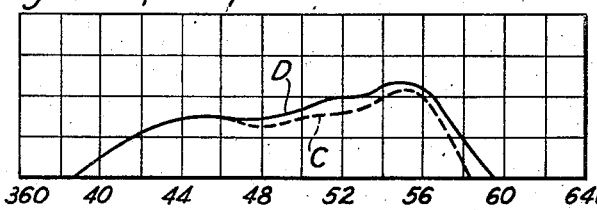

C = 6'-methyl-2,1'-diethyl-3,4-benzothia-2'-cyanine iodide.
D = 6'-methyl-2,1'-diethyl-3,4-benzothia-2'-cyanine iodide with 1-methyl-2-acetylmethylene-β-naphthothiazoline.

FIG. 3

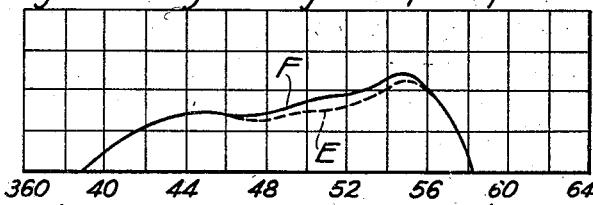

E = 6'-methyl-2,1'-diethyl-3,4-benzothia-2'-cyanine iodide.
F = 6'-methyl-2,1'-diethyl-3,4-benzothia-2'-cyanine iodide with 1-methyl-2-propionylmethylene-β-naphthothiazoline.

FIG. 4

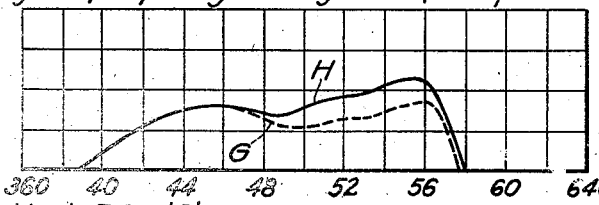

G = 3-triethyl-5,6,5',6'-dibenzoxacarbo-cyanine iodide.
H = 3-triethyl-5,6,5',6'-dibenzoxacarbo-cyanine iodide with 1-methyl-2-acetylmethylene-β-naphthothiazoline.

EDWARD P. DAVEY
INVENTOR

BY
ATTORNEYS

Patented Dec. 24, 1940

2,226,158

UNITED STATES PATENT OFFICE 2,226,158

PHOTOGRAPHIC EMULSION

Edward P. Davey, Harrow, England, assignor to Eastman Kodak Company, Rochester, N. Y., a corporation of New Jersey Application May 9, 1939, Serial No. 272,653

11 Claims. (Cl. 95—7)

This invention relates to sensitized photographic emulsions and more particularly to photographic emulsions, such as those of the silver halide type, containing one or more spectrally sensitizing materials together with one or more materials which in themselves do not materially spectrally sensitize photographic emulsions, but which, when mixed or combined with the spectrally sensitizing materials, act to increase the sensitization produced by the spectrally sensitizing materials alone.

It is known in the art of making photographic emulsions that certain dyes of the cyanine class alter the sensitivity of photographic emulsions of the silver halide kind, when the dyes are incorporated in the emulsions. It is also known that the sensitization produced by a given dye varies with the type of emulsion in which it is incorporated. Furthermore, the sensitization of a given emulsion by a given dye may be altered by varying conditions in the emulsion; for example, the sensitization of a given gelatino-silver-halide emulsion may be increased by increasing the silver ion concentration or by decreasing the hydrogen ion concentration (i. e. by increasing the alkalinity) or both. Thus, the sensitization can be increased by bathing plates, coated with a sensitized gelatino-silver-halide emulsion, in water or in solutions of ammonia. This process of altering the sensitization of a sensitized emulsion by increasing the silver ion concentration and/or by decreasing the hydrogen ion concentration is commonly called "hypersensitization." The method, since it involves bathing of coated plates, is highly impractical for anything but specialized work, and in addition, hypersensitized emulsions generally have poor keeping qualities.

More recently it has been found that the sensitization produced in an emulsion by certain spectrally sensitizing dyes can be increased by incorporating certain other spectrally sensitizing dyes in the sensitized emulsion. The effect of the mixture or combination of spectrally sensitizing dyes is more frequently considerably more, than a mere addition of the sensitizations produced in the emulsions by the dyes separately. This phenomenon has been called "supersensitization". It is a highly specific phenomenon and has been found only with combinations of dyes from certain groups. Certain supersensitizing combinations of dyes are described in United States Patents 2,075,046; 2,075,047 and 2,075,048, each dated March 30, 1937.

I have now found a new means of altering the sensitization produced in emulsions by simple cyanine and $\alpha,\alpha'$-carbocyanine dyes. Since the conditions in the emulsion, e. g. the hydrogen ion concentration or the silver ion concentration, undergo little or no change in my new method, I shall designate my new method as a kind of supersensitization. However, my new method is not to be confused with that described in the above patents, because instead of employing combinations of sensitizing dyes, I employ a mixture or combination of one or more sensitizing dyes with one or more substances which in themselves have at most but a small sensitizing effect on the emulsions. The substances which I incorporate in emulsions, in combination with the sensitizing dyes, are called organic heterocyclic nitrogen bases containing an alkyl group on the basic nitrogen atom and containing an acylmethylene group in the position adjacent to the basic nitrogen atom, i. e. in the alpha-position.

I shall refer to my mixtures of sensitizing dyes and acylmethylene compounds as new combinations, although I do not intend to imply that the sensitizing dyes and acylmethylene compounds are chemically combined. The acylmethylene compounds can be referred to as the supersensitizing substances.

It is an object, of my invention, therefore, to provide new supersensitized photographic emulsions. A further object is to provide a method of altering the sensitivity of spectrally sensitized emulsions. A further object is to provide a process for increasing the sensitivity of sensitized emulsions. A still further object is to provide a photographic element comprising supersensitized emulsions. Other more specific objects will become apparent hereinafter.

The sensitizing cyanine dyes employed in my invention sensitize, in themselves, gelatino-silver-halide emulsions between about 400 mm. and about 720 mm. The sensitizing simple cyanine dyes employed in my invention contain at least one pyridine or at least one quinoline nucleus, such as is the case in 2,2'-cyanine dyes, 5,6-benzo-2,2'-cyanine dyes, 2,4'-cyanine dyes, 4,4'-cyanine dyes, 2,2'-pyridocyanine dyes, thia-2'-cyanine dyes, benzothia-2'-cyanine dyes, selena-2'-cyanine dyes, oxazolo-2'-cyanine dyes, benzoxa-2'-cyanine dyes, thia-4'-cyanine dyes and benzothia-4'-cyanine dyes for example.

The sensitizing carbocyanine dyes employed in my invention are $\alpha,\alpha'$-carbocyanine dyes, i. e. they contain two heterocyclic nuclei linked through their alpha positions by the trimethenyl chain. The heterocyclic nuclei in the carbocyanine dyes can be quinoline nuclei, benzothiazole nuclei, naphthothiazole nuclei, benzoselenazole nuclei, benzoxazole or naphthoxazole for example.

While there is more than one manner of formulating and naming the materials which I employ in practicing my invention, it is believed that the formulas, systems of numbering and nomenclature used herein are in accordance with those used during the development of the art to its present stage. By the term "simple cyanine dye," I mean a cyanine dye in which two heterocyclic nuclei are linked or joined together by a single methenyl group. Simple cyanine dyes can be represented by the following general formulas:

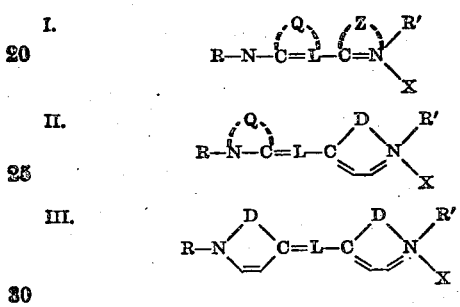

wherein D represents a divalent organic group, such as a vinylene or a phenylene group, L represents a methenyl group, R and R' represent organic groups, particularly alkyl groups, X represents an acid radical and Q and Z each represent the non-metallic atoms necessary to complete a heterocyclic nucleus. I employ those simple cyanine dyes containing at least one pyridine or at least one quinoline nucleus.

By the term "carbocyanine dye," I mean a cyanine dye in which two heterocyclic nuclei are linked or joined together by a trimethenyl chain. Carbocyanine dyes of the kind where the two heterocyclic nuclei are linked by a trimethenyl chain through their alpha positions, I will call $\alpha,\alpha'$-carbocyanine dyes. Such carbocyanine dyes can be represented by the following general formula:

IV.

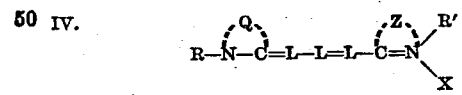

wherein L, R, R', X, Q and Z have the values set forth under Formulas I, II and III above.

The organic heterocyclic nitrogen bases containing an alkyl group on the basic nitrogen atom and containing an acylmethylene group in the alpha position can be represented by the following general formula:

V.

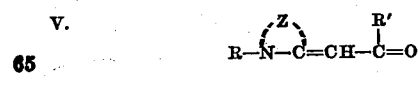

wherein R represents an alkyl group, the atomic grouping

represents an acyl group and Z represents the non-metallic atoms necessary to complete an organic heterocyclic nucleus.

Among the simple cyanine dyes which can be employed in practicing my invention are the following:

The 2,2'-cyanine dyes which can be represented by the following formula:

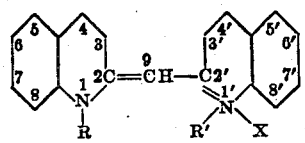

The thia-2'-cyanine dyes which can be represented by the following formula:

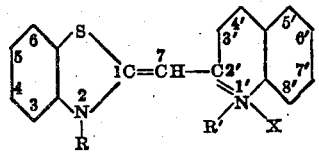

The selena-2'-cyanine dyes which can be represented by the following formula:

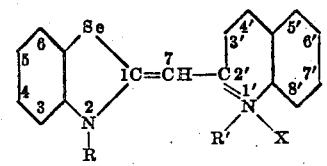

The benzothia-2'-cyanine dyes which can be represented by the following formula:

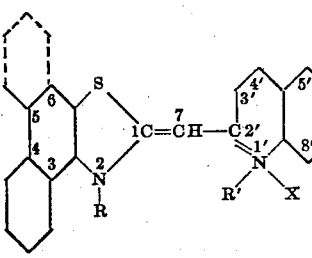

The oxazolo-2'-cyanine dyes which can be represented by the following general formula:

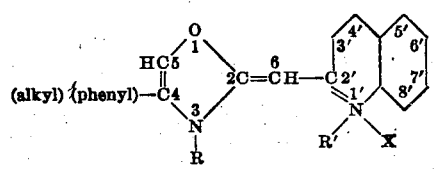

The benzoxa-2'-cyanine dyes which can be represented by the following general formula:

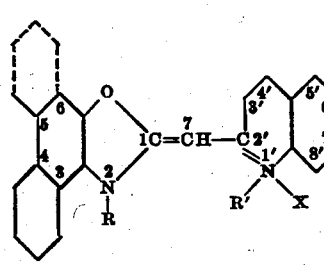

The 2,4'-cyanine dyes which can be represented by the following general formula:

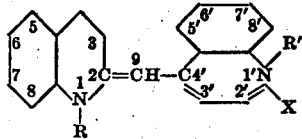

The thia-4'-cyanine dyes which can be represented by the following general formula:

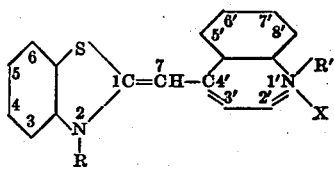

In the above formulas of simple cyanine dyes, R and R' represent alkyl groups and X represents an acid radical. In practicing my invention, I have found it advantageous to employ the dye-halides, particularly the dye-iodides (where X represents iodine). However, other dye-salts can be employed, such, for example, as the chlorides, bromides, perchlorates or p-toluene-sulfonates. I have further found it advantageous to employ simple cyanine dyes where R and R' represent alkyl groups of the formula $C_nH_{2n+1}$ wherein $n$ represents a positive integer of from one to four. The dyes wherein R and R' represent ethyl ($C_2H_5$) groups are particularly useful in practicing my invention. Among the pseudo-cyanine (2'-cyanine) dyes, i. e. those containing a quinoline nucleus, the 2,2'-cyanine, the thia-2'-cyanine, the selena-2'-cyanine, the 3,4-benzothia-2'-cyanine, the 3,4-benzoxa-2'-cyanine and oxazolo-2'-cyanine dyes are particularly advantageously employed in practicing my invention. Any of the simple cyanine dyes can carry on their nuclei substituents which do not interfere with sensitizing properties, such, for example as chloro, bromo, alkyl, alkoxy or amino groups.

The methods of preparing the simple cyanine dyes are well known and described in various patents and technical literature. However, the following will aid those skilled in the art in locating quickly the available information. 2,2'-cyanine dyes can be prepared as described by Hamer in J. Chem. Soc., page 206 et seq. (1928). 2,2'-pyridocyanine dyes can be prepared as described by Brooker and Keyes in Jour. Am. Chem. Soc. vol. 57, page 2488 et seq. (1935). Thia-2'-cyanine dyes and 5,6-benzo-2,2'-cyanine dyes can be prepared as described by Hamer in J. Chem. Soc. page 206 et seq. (1928). Selena-2'-cyanine dyes can be prepared as described by Brooker and Keyes Jour. Am. Chem. Soc. vol. 57, page 2488 et seq. (1935). Benzothia-2'-cyanine dyes can be prepared as described by Hamer in J. Chem. Soc. page 2598 et seq. (1929). Oxazolo-2'-cyanine dyes can be prepared as described in United States Patent 1,969,446, dated August 7, 1934 (see also United States Patent 2,143,839, dated January 17, 1939). Benzoxa-2'-cyanine dyes can be prepared as described in the United States Patent 1,969,448, dated August 7, 1934. 2,4'-cyanine dyes can be prepared as described by Mills and Pope in Phot. J., page 183 et seq. (1920). Still other 2'-and 4'-cyanines are described in the copending application of Burt H. Carroll and Edward P. Davey, Serial No. 145,534, filed May 29, 1937.

Among the α,α'-carbocyanine dyes which can be employed in practicing my invention are the following:

The 8-alkylthiacarbocyanine dyes which can be represented by the following general formula:

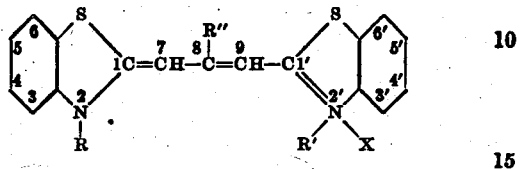

The 8-alkylselencarbocyanine dyes which can be represented by the following general formula:

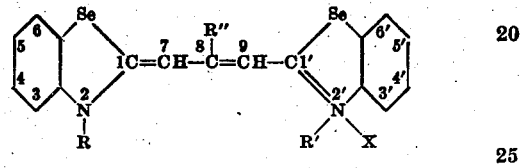

The 8 - alkyl - 3',4' - benzoxathiacarbocyanine dyes which can be represented by the following general formula:

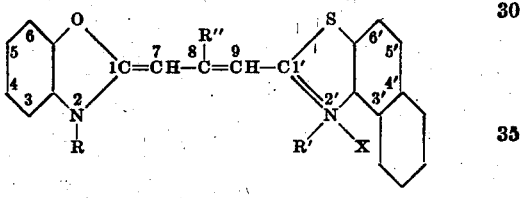

The 8-alkyl-3,4,3',4'-dibenzothiacarbocyanine dyes which can be represented by the following general formula:

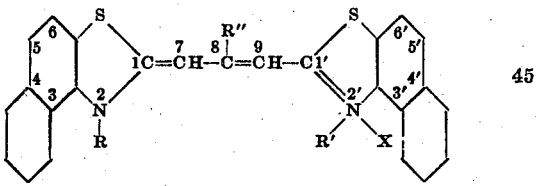

The 8-alkyloxathiacarbocyanine dyes which can be represented by the following general formula:

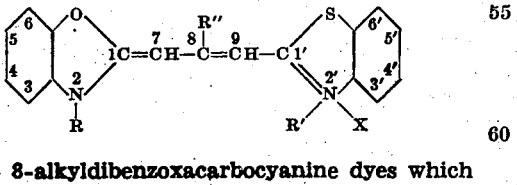

The 8-alkyldibenzoxacarbocyanine dyes which can be represented by the following general formula:

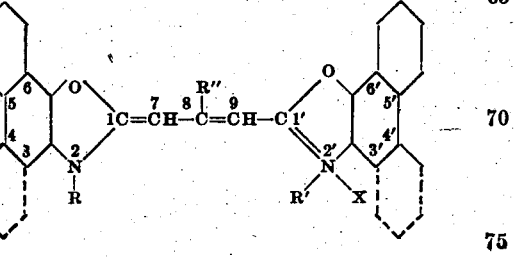

The 2,2'carbocyanine dyes which can be represented by the following general formula:

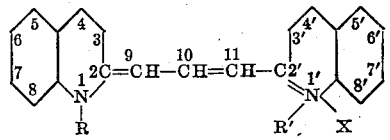

The oxacarbocyanine dyes which can be represented by the following general formula:

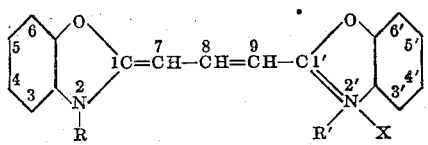

In the above formulas of α,α'-carbocyanine dyes, R, R' and R'' represent alkyl groups and X represents an acid radical. In practicing my invention, I have found it advantageous to employ the dye-halides, particularly the dye-iodides (where X represents iodine). However, other dye-salts can be employed, such, for example, as the chlorides, bromides, perchlorates and p-toluene-sulfonates. I have further found it advantageous to employ carbocyanine dyes where R, R' and R'' represent alkyl groups having the formula $C_nH_{2n+1}$ wherein $n$ represents a positive integer of from one to four. The dyes wherein R and R' represent ethyl ($C_2H_5$) groups and wherein R'' represents methyl or ethyl are especially advantageously employed. Among the α,α'-carbocyanine dyes, the 8-alkyl-α,α'-carbocyanines are advantageously employed; especially the 8-alkylthiacarbocyanine, the 8-alkylselenacarbocyanine, the 8-alkyl-3', 4'-benzoxathiacarbocyanine, the 8-alkyl-3,4,3',4'-dibenzothiacarbocyanine, the 8-alkyloxathiacarbocyanine and the 8-alkyldibenzoxacarbocyanine dyes. The α,α'-carbocyanine dyes can be substituted in their nuclei with simple substituents which do not interfere with sensitizing properties, such, for example, as with chloro, bromo, alkyl, alkoxy and amino groups.

The methods for preparing α,α'-carbocyanine dyes are well known and described in various patents and technical literature. The following will aid those skilled in the art in locating quickly the available information.

2,2'-carbocyanine dyes and oxacarbocyanine dyes can be prepared as described by Hamer in J. Chem. Soc., page 2796 et seq. (1927). 8-alkylthiacarbocyanine dyes can be prepared as described in United States Patent 1,934,657, dated November 7, 1933. 8-alkylselenacarbocyanine dyes can be prepared as described in United States Patent 1,990,681, dated February 12, 1935. 8-alkyldibenzothiacarbocyanine dyes can be prepared as described in United States Patent 1,969,444, dated August 7, 1934. Unsymmetrical carbocyanine dyes, such as 8-alkyloxathiacarbocyanine and 8-alkyl-3',4'-benzoxathiacarbocyanine dyes, can advantageously be prepared as described in United States Patent 2,112,140, dated March 22, 1938. Still other methods for the preparation of α,α'-carbocyanine dyes are described in the copending application of Burt H. Carroll and Edward P. Davey, Serial No. 145,534, filed May 29, 1937.

Among the organic heterocyclic nitrogen bases containing an alkyl group on the basic nitrogen atom and containing an acylmethylene group in the α-position which I employ in practicing my invention are the following:

The 1-acylmethylene-2-alkylbenzothiazolines (1-acylmethylene-2-alkyl-1,2-dihydrobenzothiazoles) which can be represented by the following formula:

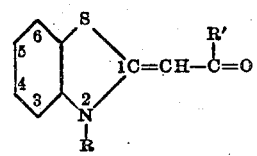

The 1-acylmethylene-2-alkylbenzoselenazolines (1-acylmethylene-2-alkyl-1,2-dihydrobenzoselenazoles) which can be represented by the following formula:

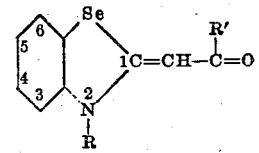

The 2-acylmethylene-1-alkyl-β-naphthothiazolines (2-acylmethylene-1-alkyl-1,2-dihydro-β-naphthothiazoles) which can be represented by the following formula:

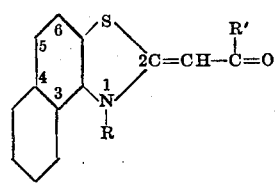

The 1-acylmethylene-2-alkyl-α-naphthothiazolines (1-acylmethylene-2-alkyl-1,2-dihydro-α-naphthothiazoles) which can be represented by the following formula:

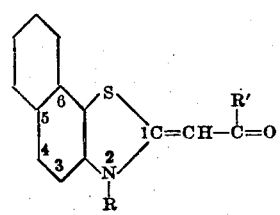

In the above formulas, R represents an alkyl group and R' represents hydrogen or an alkyl group. I have found it advantageous to employ acylmethylene compounds wherein R and R' represent alkyl groups of the formula $C_nH_{2n+1}$ wherein $n$ represents a positive integer of from one to four. Acylmethylene compounds wherein R' represent methyl ($CH_3$) groups are particularly advantageously employed. Among the acylmethylene compounds, the 2-actylmethylene-1-alkyl-1,2-dihydro-β-naphthothiazoles, the 1-acetylmethylene-2-alkyl-dihydro-β-naphthothiazoles, the 1-acetylmethylene-2-alkyl-1,2-dihydrobenzothiazoles and the 1-acetylmethylene-2-alkyl-1,2-dihydrobenzoselenazoles, particularly the acetylmethylene compound from 1,2-dihydro-β-naphthothiazole, are advantageously employed.

Acylmethylene compounds are well known. Methods for their preparation (other than formylmethylene) can be found for example in United States Patent 2,112,139, dated March 22, 1938. Methods for the preparation of formylmethylene compounds can be found for example in British Patent 466,268, complete accepted May 18, 1937:

According to my invention, I incorporate one or more sensitizing simple cyanine dyes of the aforesaid type and/or one or more sensitizing $\alpha,\alpha'$-carbocyanine dyes, together with one or more organic heterocyclic nitrogen bases containing an alkyl group on the basic nitrogen atom and containing an acylmethylene group in the alpha position. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, but more particularly the customarily employed silver chloride and silver bromide emulsions. The silver chloride and silver bromide emulsions may contain other salts which may be light sensitive. By way of illustration, the herein described supersensitized emulsions were prepared employing an ordinary gelatino-silver-bromide emulsion of ordinary concentration (approximately 40 grams of silver halide per liter).

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention the sensitizing dyes are advantageously employed in about their optimum concentrations or somewhat less, although they may be employed in concentrations above their optimum concentrations.

The optimum concentration of a sensitizing dye or combination of sensitizing dyes can be determined in a manner well known to those skilled in the art by measuring the sensitivity of a series of emulsions containing different concentrations of the sensitizing dye or dyes. Ordinarily, the optimum or near optimum concentration of a sensitizing dye is of the order of 5 to 20 mg. per liter of the dye per liter of ordinary emulsion.

In practicing my invention the sensitizing dyes are ordinarily advantageously employed in concentrations within the range of 5 to 20 mg. per liter of emulsion. The acylmethylene compounds are ordinarily advantageously employed in concentrations of the same order, although concentrations of from one-tenth to one hundred times the concentration of the sensitizing dyes have been employed.

In addition to acting as supersensitizers, the acylmethylene compounds have a tendency to reduce fog in photographic emulsions. As antifoggants they can be incorporated in emulsions in about the same concentrations as are advantageously employed for supersensitization, with or without sensitizing dyes.

The methods of incorporating sensitizing dyes in emulsions are simple and well known to those skilled in the art. In practicing my invention, the sensitizing dyes of my combinations can be incorporated in the emulsions separately or together with the acylmethylene compounds. It is convenient to add first the dyes in the form of solutions in appropriate solvents. Then, the acylmethylene compounds can be added, advantageously in the form of a solution. The solvents employed must, of course, be compatible with the emulsions, substantially free from any deleterious effect on the light-sensitive materials and capable of dissolving the dyes and the acylmethylene compounds. Methanol has proven satisfactory as a solvent for both the dyes and the acylmethylene compounds in practicing my invention. Acetone can also be employed. The dyes and the acylmethylene compounds are advantageously incorporated in the finished, washed emulsions and should be uniformly distributed throughout the emulsions. The following procedure is satisfactory: A stock solution of the dye or of the acylmethylene compound is prepared by dissolving the dye or acylmethylene compound in a suitable solvent, such as methyl or ethyl alcohol or acetone. Then, to one liter of a flowable gelatino-silver-halide emulsion, an amount of the so-prepared stock solution, diluted somewhat with water is desired, containing the desired amount of dye or acylmethylene compound is slowly added with stirring. Stirring is continued until the dye or acylmethylene compound is thoroughly incorporated. The supersensitized emulsion can then be coated out on a suitable support, such as glass, cellulose derivative, resinous material, paper or the like, to a suitable thickness and allowed to dry. The details of such coating methods are well known to those skilled in the art.

The amount of dye or acylmethylene compound actually incorporated in the emulsion will, of course, vary from dye to dye and acylmethylene compound to acylmethylene compound, according to the emulsion employed and according to the supersensitizing effect desired. The regulation and adoption of the most economical and useful proportions will be apparent to those skilled in the emulsion art upon the ordinary observations and tests customarily employed in the art. Accordingly, the foregoing procedures and proportions are to be regarded only as illustrative.

The following combinations of sensitizing dyes and acylmethylene compounds all illustrative of combinations which can be employed in practicing my invention. These illustrations are not intended to be limiting.

A. 1 - ethyl-2-acetylmethylene-$\beta$-naphthothiazoline (1-ethyl-2-acetylmethylene-1,2-dihydro-$\beta$-naphthothiazole) with one or more of the following dyes:

1,1'-diethyl-2,2'-cyanine iodide.
6,6'-dimethyl-1,1'-diethyl-2,2'-cyanine iodide.
2 - methyl - 1'-ethyl-3,4-benzothia-2'-cyanine iodide.
6' - methyl - 2,1'-diethyl-3,4-benzothia-2'-cyanine iodide.
2-methyl-1'-ethylthia-2'-cyanine iodide.
4 - phenyl-3,1'-diethyloxazolo-2'-cyanine iodide.
2,1'-diethyl-3,4-benzoxa-2'-cyanine iodide.
2,1'-diethylselena-2'-cyanine iodide.
8 - methyl-2,2'-diethylthiacarbocyanine bromide.
2,2'-dimethyl-8-ethylthiacarbocyanine iodide.
4,4' - dichloro-2,2',8-triethylthiacarbocyanine chloride.
8 - methyl - 2,2'-diethyl-3,4,3',4'-dibenzothiacarbocyanine iodide.
2,2' - dimethyl-8-ethyl - 3,4,3',4'-dibenzothiacarbocyanine iodide.
2,2',8-triethylselenacarbocyanine iodide.

8 - methyl 2,2' - diethyl 3',4' - benzoxathiacarbocyanine iodide.

2,2',-8-triethyl-5,6,5',6'-dibenzoxacarbocyanine iodide.

8 - methyl - 2,2' - diethyloxathiacarbocyanine iodide.

1,1'-diethyl-2,2'-carbocyanine iodide.

2,2'-diethyloxacarbocyanine iodide.

2,2' - diethyl - 5,6,5',6'-dibenzoxacarbocyanine iodide.

2,2' - diethyl-3,4,3',4' - dibenzoxacarbocyanine iodide.

1,1'-diethyl-2,4'-cyanine iodide.

2,1'-diethylthia-4'-cyanine iodide.

B. 1 - ethyl-2 - propionylmethylene - β-naphthothiazoline (1-ethyl-2-propionylmethylene-1,2-dihydro-β-naphthothiazole) with one or more of the following dyes:

1,1'-diethyl-2,2'-cyanine iodide.

6,6' - dimethyl-1,1' - diethyl-2,2'-cyanine iodide.

2 - methyl-1'-ethyl-3,4-benzothia-2' - cyanine iodide.

6' - methyl-2,1' - diethyl-3,4 - benzothia-2'-cyanine iodide.

2,1'-diethyl-3,4-benzoxa-2'-cyanine iodide.

8-methyl-2,2'-diethylthiacarbocyanine iodide.

4,4' - dichloro-2,2',8-triethylthiacarbocyanine chloride.

8 - methyl - 2,2'-diethyl-3',4'-benzoxathiacarbocyanine iodide.

C. 1,1'-diethyl-2,2'-cyanine iodide with one or more of the following acylmethylene compounds:

1 - ethyl - 2 - acetylmethylene-β-naphthothiazoline.

2-ethyl-1-acetylmethylenebenzothiazoline.

1 - ethyl-2 - formylmethylene-β'-naphthothiazoline.

2-ethyl-1-furoylmethylenebenzothiazoline.

2-ethyl-1-acetylmethylenebenzoselenazoline.

2 - formylmethylene - 1,6-dimethyl-1,2-dihydroquinoline.

1 - ethyl - 2 - propionylmethylenebenzothiazoline.

D. 2,2' - 8 - triethyl - 4,4' - dichlorothiacarbocyanine bromide with one or more of the following acylmethylene compounds:

1 - methyl - 2-propionylmethylene-β-naphthothiazoline.

2 - ethyl - 1-propionylmethylenebenzoselenazoline.

2 - methyl - 1 - propionylmethylenebenzothiazoline.

The accompanying drawing depicts graphically the supersensitizing effect attained in four of my new combinations. Each figure of the drawing is a diagrammatic reproduction of two spectrograms showing first the sensitivity of a silver bromide emulsion containing a simple cyanine dye or a carbocyanine dye (represented by the dotted curve in each figure) and showing second the sensitivity of the same silver bromide emulsion containing a mixture or combination of the said sensitizing dye together with an acylmethylene compound (represented by the solid curve in each figure). The supersensitizing effect is apparent from the curves.

In Fig. 1, curve A represents the sensitivity of an ordinary gelatino-silver-halide emulsion containing 1,1'-diethyl-2,2'-cyanine iodide in a concentration of 15 mg. per liter of emulsion. Curve B represents the sensitivity of the same gelatino-silver-bromide emulsion containing 15 mg. of 1,1'-diethyl-2,2'-cyanine iodide per liter of emulsion and 20 mg. of 1-methyl-2-acetylmethylene-β-naphthothiazoline per liter of emulsion. The increase in green sensitivity owing to the 1-methyl-2-acetylmethylene compound is about 150%.

In Fig. 2, curve C represents the sensitivity of an ordinary gelatino-silver-halide emulsion containing 6'-methyl-2,1'-diethyl-3,4-benzothia-2'-cyanine iodide in a concentration of about 20 mg. per liter of emulsion. Curve D represents the sensitivity of the same gelatino-silver-bromide emulsion containing 20 mg. of 6'-methyl-2,1'-diethyl-3,4-benzothia-2'-cyanine iodide per liter of emulsion and 20 mg. of 1-methyl-2-acetylmethylene-β-naphthothiazoline per litter of emulsion. The increase in green sensitivity owing to the 1-methyl-2-acetylmethylene compound is about 100%.

In Fig. 3, curve E represents the sensitivity of an ordinary gelatino-silver-halide emulsion containing 6'-methyl-2,1'-diethyl-3,4-benzothia-2'-cyanine iodide in a concentration of about 20 mg. per liter of emulsion. Curve F represents the sensitivity of the same gelatino-silver-bromide emulsion containing 20 mg. of 6'-methyl-2,1'-diethyl-3,4-benzothia-2'-cyanine iodide per liter of emulsion and 20 mg. of 1-methyl-2-propionylmethylene-β-naphthothiazoline per liter of emulsion. The increase in green sensitivity owing to the 1-methyl-2-propionylmethylene compound is about 40%.

In Fig. 4, curve G represents the sensitivity of an ordinary gelatino-silver-bromide emulsion containing 2,2',8-triethyl-5,6,5',6'-dibenzoxacarbocyanine iodide in a concentration of 10 mg. per liter of emulsion. Curve H represents the sensitivity of the same gelatino-silver-bromide emulsion containing 10 mg. of 5,6,5',6'-dibenzoxacarbocyanine iodide per liter of emulsion and 20 mg. of 1-methyl-2-acetylmethylene-β-naphthothiazoline per liter of emulsion. The increase in green sensitivity owing to the 1-methyl-2-acetylmethylene compound is about 150%.

The spectrograms corresponding to the figures of the accompanying drawing were made in a wedge spectrograph. Each horizontal line represents an incident light intensity of about one-tenth of that of the line below it. The spectrograms with and without the acylmethylene compounds were made from plates coated from the same batch of emulsion, dried and processed together.

Similarly an ordinary gelatino-silver-bromide emulsion sensitized with 8-methyl-2,2'-diethylthiacarbocyanine bromide (10 mg. per liter of emulsion) showed about a 20% increase in minus blue speed, when 1-methyl-2-acetylmethylene-β-naphthothiazoline (20 mg. per liter of emulsion) was incorporated in the sensitized emulsion. An ordinary gelatino-silver-bromide emulsion sensitized with 4,4'-dichloro-2,2',8-triethylthiacarbocyanine chloride (10 mg. per liter of emulsion) showed about a 40% increase in red sensitivity when 1-methyl-2-acetylmethylene-β-naphthothiazoline (20 mg. per liter of emulsion) was incorporated in the sensitized emulsion. An ordinary gelatino-silver-bromide emulsion sensitized with 2,2',8-triethylselenacarbocyanine iodide (10 mg. per liter of emulsion) showed about a 30% increase in red sensitivity when 1-methyl-2-acetylmethylene-β-naphthothiazoline (20 mg. per liter of emulsion) was incorporated in the sensitized emulsion. An ordinary gelatino-silver-bromide emulsion sensitized with 1,1'-diethyl- 2,2'-carbocyanine iodide (10 mg. per liter of emulsion) showed about a 40% increase in red sensitivity when 1-methyl-2-acetyl-methylene-β-naphthothiazoline (20 mg. per liter of emulsion) was incorporated in the sensitized emulsion. An ordinary gelatino-silver-bromide emulsion sensitized with 2,2'-diethyl-5,6,5',6'-dibenzoxacarbocyanine iodide (20 mg. per liter of emulsion) showed about a 10% increase in green sensitivity when 1-methyl-2-acetylmethylene-β-naphthothiazoline (20 mg. per liter of emulsion) was incorporated in the sensitized emulsion. An ordinary gelatino-silver-bromide emulsion sensitized with 4,4'-dichloro-2,2',8-triethylthiacarbocyanine chloride (10 mg. per liter of emulsion) showed about a 40% increase in red sensitivity when 1-methyl-2-propionylmethylene-β-naphthothiazoline (20 mg. per liter of emulsion) was incorporated in the sensitized emulsion.

Still further illustrations of the supersensitizing effects attainable according to my invention could be given, but the foregoing will suffice to demonstrate to those skilled in the art the manner of practicing the invention.

What I claim as my invention and desire to be secured by Letters Patent of the United States is:

1. A photographic silver-halide emulsion containing at least one organic heterocyclic nitrogen base containing an alkyl group on the basic nitrogen atom and containing an acylmethylene group in the position adjacent to the basic nitrogen atom.

2. A photographic gelatino-silver-halide emulsion containing at least one organic heterocyclic nitrogen base containing an alkyl group on the basic nitrogen atom and containing an acylmethylene group in the position adjacent to the basic nitrogen atom.

3. A photographic silver-halide emulsion containing a supersensitizing combination of at least one sensitizing dye selected from the group consisting of simple cyanine dyes containing at least one pyridine nucleus, simple cyanine dyes containing at least one quinoline nucleus and α.α'-carbocyanine dyes, together with at least one organic heterocylic nitrogen base containing an alkyl group on the basic nitrogen atom and containing an acylmethylene group in the position adjacent to the basic nitrogen atom.

4. A photographic gelatino-silver-halide emulsion containing a supersensitizing combination of at least one sensitizing dye selected from the group consisting of simple cyanine dyes containing at least one pyridine nucleus, simple cyanine dyes containing at least one quinoline nucleus and α,α'-carbocyanine dyes, together with at least one organic heterocyclic nitrogen base containing an alkyl group on the basic nitrogen atom and containing an acylmethylene group in the position adjacent to the basic nitrogen atom.

5. A photographic gelatino-silver-halide emulsion containing a supersensitizing combination of at least one sensitizing 8-alkyl-α,α'-carbocyanine dye, together with at least one organic heterocyclic nitrogen base containing an alkyl group on the basic nitrogen atom and containing an acylmethylene group in the position adjacent to the basic nitrogen atom.

6. A photographic gelatino-silver-halide emulsion containing a supersensitizing combination of at least one sensitizing 8-alkyl-α,α'-carbocyanine dye, together with at least one organic heterocyclic nitrogen base of the following formula:

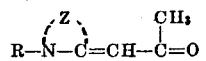

where R represents an alkyl group and Z represents the nonmetallic atoms necessary to complete an organic heterocyclic nucleus selected from the group consisting of benzothiazole, benzoselenazole and naphthothiazole nuclei.

7. A photographic gelatino-silver-halide emulsion containing a supersensitizing combination of at least one sensitizing pseudocyanine dye, together with at least one organic heterocyclic nitrogen base of the following formula:

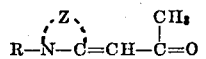

wherein R represents an alkyl group of the formula $C_nH_{2n+1}$ wherein $n$ represents a positive integer of from one to four and Z represents the non-metallic atoms necessary to complete an organic heterocyclic nucleus selected from the group consisting of benzothiazole, benzoselenazole and naphthothiazole nuclei.

8. A photographic gelatino-silver halide emulsion containing a supersensitizing combination of at least one sensitizing 2,2'-cyanine dye, together with at least one organic heterocyclic nitrogen base of the following formula:

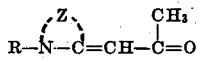

wherein R represents an alkyl group of the formula $C_nH_{2n+1}$ wherein $n$ represents a positive integer of from one to four and Z represents the non-metallic atoms necessary to complete an organic heterocyclic nucleus selected from the group consisting of benzothiazole, benzoselenazole and naphthothiazole nuclei.

9. A photographic gelatino-silver-halide emulsion containing a supersensitizing combination of at least one sensitizing 1,1'-dialkyl-2,2'-cyanine dye, the said alkyl groups each being of the formula $C_nH_{2n+1}$ wherein $n$ represents a positive integer of from one to four, together with at least one organic heterocyclic nitrogen base of the following formula:

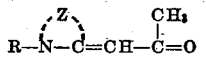

wherein R represents an alkyl group of the formula $C_nH_{2n+1}$ wherein $n$ represents a positive integer of from one to four and Z represents the non-metallic atoms necessary to complete an organic nucleus selected from the group consisting of benzothiazole, benzoselenazole and naphthothiazole nuclei.

10. A photographic gelatino-silver halide emulsion containing a supersensitizing combination of at least one sensitizing 8-alkyl-α,α'-carbocyanine dye selected from the group consisting of 8-alkylthiacarbocyanine dyes, 8-alkyl-3,4,3',4'-dibenzothiacarbocyanine dyes, 8-alkylselenacarbocyanine dyes, 8-alkyl-3,4,3',4'-dibenzoxacarbocyanine dyes, 8-alkyl-5,6,5',6'-dibenzoxacarbocyanine dyes, 8-alkyl-oxathiacarbocyanine dyes and 8-alkyl-3',4'-benzoxathiacarbocyanine dyes, together with at least one organic heterocyclic nitrogen base of the following general formula:

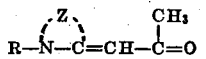

wherein R represents an alkyl group of the formula $C_nH_{2n+1}$ wherein $n$ represents a positive integer of from one to four and Z represents the non-metallic atoms necessary to complete an organic nucleus selected from the group consisting of benzothiazole, benzoselenazole and naphthothiazole nuclei.

11. A photographic gelatino-silver-halide emulsion containing a supersensitizing combination of at least one sensitizing dye selected from the group consisting of 2,2'-dialkyl-8-alkylthiacarbocyanine dyes, 2,2'-dialkyl-8-alkyl-3,4,3',4'-dibenzothiacarbocyanine dyes, 2,2'-dialkyl-8-alkyl-3,4,3',4'-dibenzoxacarbocyanine dyes, 2,2'-dialkyl-8-alkyl-5,6,5',6'-dibenzoxacarbocyanine dyes, 2,2'-dialkyl-8-alkylselenacarbocyanine dyes, the said alkyl groups each being of the formula $C_nH_{2n+1}$ wherein $n$ represents a positive integer of from one to four, together with at least one organic heterocyclic nitrogen base of the following general formula:

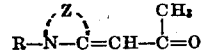

wherein R represents an alkyl group of the formula $C_nH_{2n+1}$ wherein $n$ represents a positive integer of from one to four and Z represents the non-metallic atoms necessary to complete an organic heterocyclic nucleus selected from the group consisting of benzothiazole, benzoselenazole and naphthothiazole nuclei.

EDWARD P. DAVEY.